United States Patent
Yeh et al.

(10) Patent No.: US 6,470,367 B1
(45) Date of Patent: Oct. 22, 2002

(54) APPARATUS AND METHOD FOR IMPLEMENTING AN INVERSE ARCTANGENT FUNCTION USING PIECEWISE LINEAR THEOREM TO SIMPLIFY

(75) Inventors: Yuh-miin Yeh, Taoyuan; Chin-Hung Chiou, Hsinchu, both of (TW)

(73) Assignee: Chung-Shan Institute of Science, Taoyuan (TW)

( * ) Notice: Subject to any disclaimer, the term of this patent is extended or adjusted under 35 U.S.C. 154(b) by 0 days.

(21) Appl. No.: 09/457,754

(22) Filed: Dec. 8, 1999

(51) Int. Cl.⁷ .............................. G06F 7/38; G06F 1/02
(52) U.S. Cl. ...................................... 708/440; 708/276
(58) Field of Search .................................. 708/440, 276

(56) References Cited

U.S. PATENT DOCUMENTS

| | | | | |
|---|---|---|---|---|
| 4,164,022 A | * | 8/1979 | Rattlingourd et al. | ....... 708/440 |
| 4,710,892 A | * | 12/1987 | Fling | ............................ 708/440 |
| 4,910,698 A | * | 3/1990 | McCartney | .................. 708/276 |
| 5,648,924 A | * | 7/1997 | Smith | ........................... 708/440 |
| 6,018,552 A | * | 1/2000 | Uesugi | ......................... 708/440 |
| 6,385,632 B1 | * | 5/2002 | Choe et al. | .................. 708/276 |

* cited by examiner

Primary Examiner—Tan V. Mai
(74) Attorney, Agent, or Firm—Christensen O'Connor Johnson Kindness PLLC

(57) ABSTRACT

The present invention discloses an apparatus and method for implementing an inverse arctangent function using piecewise linear theorem to simplify and used to transform a right-angled coordinate point X and Y to a phase angle θ of an inverse arctangent function. The present invention uses T-line combination to approach an inverse arctangent function between 0 degree to 45 degree, and determines which piecewise linear region the right-angled coordinate point is located at. A coefficient table stored in a memory is used to compute $\hat{\theta}$ which is the approximate value of the phase angle θ. The phase angle $\hat{\theta}$ between 45 degree to 360 degree can be mapped to the approximate phase angle $\hat{\theta}$ between 0 degree to 45 degree using linear combination.

8 Claims, 4 Drawing Sheets

APPARATUS AND METHOD FOR IMPLEMENTING AN INVERSE ARCTANGENT FUNCTION USING PIECEWISE LINEAR THEOREM TO SIMPLIFY

BACKGROUND OF THE INVENTION

1. Field of the Invention

The present invention relates to an apparatus and method for implementing an inverse arctangent function, particularly to an apparatus and method for implementing an inverse arctangent function using piecewise linear theorem to simplify.

2. Description of the Related Art

There are three conventional methods of transformming an inverse arctangent function. The first method is called CORDIC (Coordinate Rotation Digital Computer) coordinate transformation, which uses a multi-stage structure to obtain high accuracy, but the disadvantages of the structure are expensive in hardware costs and long output delay. The above technology is disclosed in "GEC Plessy, IC Handbook for Digital Video & Digital Signal Processing, Sec. PDSP16330, England, 1995." The second method is to use a look-up table, which records every input point and its corresponding output point. The structure of the second method is very simple, but the disadvantage is that a lot of memories are needed. The third method is to use a floating point operation, which uses floating point operations on expansion equations and multi-iteration operations to obtain high accuracy. The disadvantage of the third method is that a lot of hardware costs are needed and it is difficult to complete an inverse arctangent operation using a single instruction. The third method is disclosed in Texas Instrument, "TMS320c40 User Guide, 1993." As mentioned above, the expected performance of an inverse arctangent function, such as high speed, low error and low hardware cost can not be obtained through the prior art technologies.

SUMMARY OF THE INVENTION

The object of the present invention is to eliminate the drawbacks of generating more errors and more hardware costs in conventional implementation of an inverse arctangent function. To this end, the present invention provides a method and an apparatus of implementing an inverse arctangent function using the theorem of piecewise linear approach to simplify, which transforms two input right-angled coordinate points X and Y to $\hat{\theta}$ which is an approximate value of a phase angle $\theta$ of an inverse arctangent function. The present invention uses T-lines combination to approach an inverse arctangent function between 0 degree to 45 degree. Which line segment the input right-angled coordinate points is located in is determined, and the approximate value $\hat{\theta}$ is determined by a predefined coefficient table stored in a memory. The phase angles $\hat{\theta}$ between 45 degree to 360 degree can be obtained through the linear combination transformation of the phase angles $\theta$ between 0 degree to 45 degree.

The apparatus of the present invention mainly comprises: a processing unit which employs the equation $$\hat{\theta} = \Omega(s) + \Phi(s) \cdot \left( c(k) + d(k) \cdot \frac{y_m}{x_m} \right)$$

to transfer a right-angled coordinate point X and Y to an approximate value $\hat{\theta}$ of a phase angle $\theta$ of an inverse arctangent function; and a memory unit connected to said processing unit for storing the value of c(k) and d(k). The method of the present invention mainly comprises: approaching an inverse arctangent function between 0 degree to 45 degree by using T-line combination, and establishing and storing in advance a table containing a plurality of parameters c(k) and d(k); determining which piece said right-angled coordinate point is located at, and capturing the corresponding value of c(k) and d(k) stored in said table; and generating $\hat{\theta}$ which is an approximate value of the phase angle $\theta$ based on the equation of $$\hat{\theta} = \Omega(s) + \Phi(s) \cdot \left( c(k) + d(k) \cdot \frac{y_m}{x_m} \right).$$

The present invention can also be implemented by software, because of simplicity of the structure and less operations. The implementation by software also has the advantage as above-mentioned.

BRIEF DESCRIPTION OF THE DRAWINGS

The present invention will be described according to the accompanying drawings in which.

PREFERRED EMBODIMENT OF THE INVENTION

The phase angle $\theta$ of an inverse arctangent function of the point (x, y) at a right-angled coordinate has the following well-known transformation formula:

$$\theta = \tan^{-1}\left(\frac{y}{x}\right) \quad (1)$$

Figure 1:
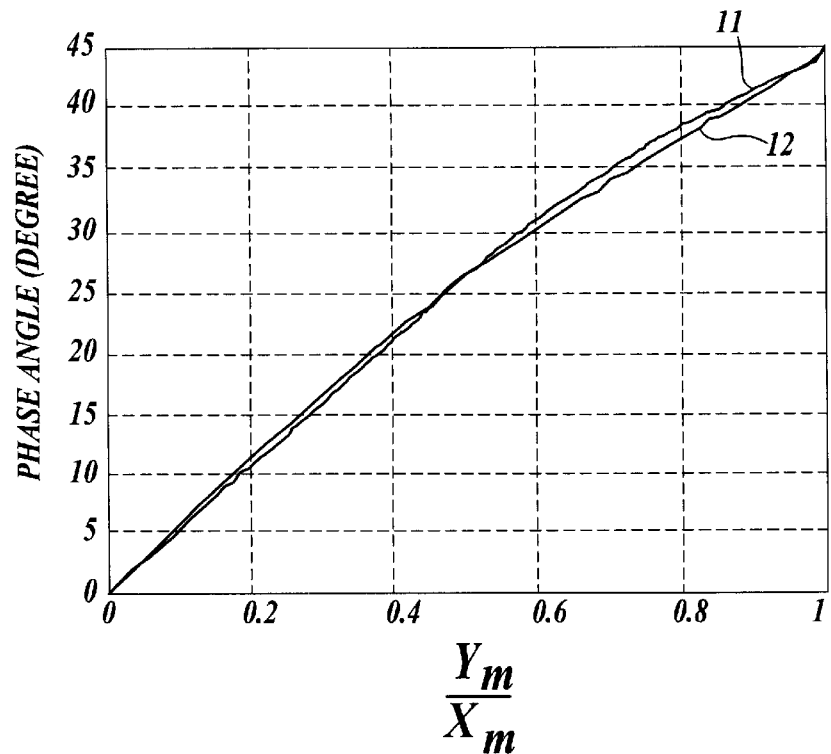
FIG. 1 shows a corresponding diagram of using 2 line segments (T=2) to approach an inverse arctangent function between 0 degree to 45 degree according to the present invention.

The present invention uses the theorem of piecewise linear approach to replace above function. The XY plane at which a right-angled coordinate point (x, y) locates can be divided into eight parts, wherein s=0 represents a range from 0 degree to 45 degree, s=1 represents a range from 45 degree to 90 degree, and similarly, s=7 represents a range from 315 degree to 360 degree. Due to symmetric relationships, the ranges from s=1 to s=7 can be mapped to the range of s=0. An inverse arctangent function from 0 degree to 45 degree can be approximated by T-line combination. FIG. 1 shows a diagram of using 2 lines (T=2) to approach an inverse arctangent function between 0 degree to 45 degree according to the present invention, $\hat{\theta}$ which is the approximate value of $\theta$ can be represented by equation (2).

$$\hat{\theta} = \Omega(s) + \Phi(s) \cdot \left( c(k) + d(k) \cdot \frac{y_m}{x_m} \right) \quad (2)$$

Equation (2) can be implemented by one multiplier and two adders or substracters; wherein $x_m$=MAX(|x|, |y|), $y_m$=MIN(|x|, |y|), k represents the number of a piecewise line at which the coordination point (x, y) is located, and T (T=$2^{sb}$, sb is the abbreviation of "sec-bit," its value $\geq 1$) is the number of piecewise lines. Because $0 \leq y_m \leq x_m$, it can be inferred that $k \in \{0,1, \ldots 2^{sb}-1\}$, and k will be obtained through equation (3).

$$k = \left\lfloor 2^{sb} \cdot \frac{y_m}{x_m} \right\rfloor \quad (3)$$

$\Omega(s)$, $\Phi(s)$ are transformation parameters that map $\hat{\theta}$ between 45 degree to 360 degree to $\hat{\theta}$ between 0 degree to 45 degree, and can be obtained from equation (4) and equation (5).

$$\Omega(s) = \frac{\pi}{2} \cdot \left\lfloor \frac{s+1}{2} \right\rfloor \quad (4)$$

$$\Phi(s) = (-1)^s \quad (5)$$

c(k) and d(k) can be obtained by using interpolation method through end angle of a piecewise line and the value of $$\frac{y_m}{x_m},$$

as shown in equation (6) and equation (7).

$$c(k) = \tan^{-1}\left(\frac{k+1}{T}\right) - (k+1)\left(\tan^{-1}\left(\frac{k+1}{T}\right) - \tan^{-1}\left(\frac{k}{T}\right)\right) \quad (6)$$

$$d(k) = T\left(\tan^{-1}\left(\frac{k+1}{T}\right) - \tan^{-1}\left(\frac{k}{T}\right)\right) \quad (7)$$

Table 1 is an example of using k as an index for corresponding to c(k) and d(k) parameters, wherein c(k) and d(k) are represented by 16 bits ($b_{15}$~$b_0$).

TABLE 1

| k | c(k) | $b_{15}$~$b_0$ | d(k) | $b_{15}$~$b_0$ |
|---|------|----------------|------|----------------|
| 0 | 0 | 0000000000000000 | 0.1589 | 0010100010110000 |
| 1 | 0.0001 | 0000000000000101 | 0.1577 | 0010100001100000 |
| 2 | 0.0004 | 0000000000001000 | 0.1553 | 0010011111000010 |
| 3 | 0.0010 | 0000000001000011 | 0.1518 | 0010011011011111 |
| 4 | 0.0021 | 0000000010001011 | 0.1474 | 0010010110111111 |
| 5 | 0.0037 | 0000000011110100 | 0.1423 | 0010010001101110 |
| 6 | 0.0059 | 0000000110000001 | 0.1366 | 0010001011110111 |
| 7 | 0.0085 | 0000001000110000 | 0.1305 | 0010000101100110 |
| 8 | 0.0117 | 0000001100000000 | 0.1241 | 0001111111000110 |

TABLE 1-continued

| k | c(k) | $b_{15}$~$b_0$ | d(k) | $b_{15}$~$b_0$ |
|---|------|----------------|------|----------------|
| 9 | 0.00154 | 0000001111101110 | 0.1177 | 0001111000011111 |
| 10 | 0.00194 | 0000010011110101 | 0.1112 | 0001110001111010 |
| 11 | 0.00237 | 0000011000010001 | 0.1049 | 0001101011011110 |
| 12 | 0.00283 | 0000011100111101 | 0.0988 | 0001100101001101 |
| 13 | 0.0330 | 0000100001110101 | 0.0930 | 0001011111001101 |
| 14 | 0.00379 | 0000100110110101 | 0.0874 | 0001011001011111 |
| 15 | 0.00429 | 0000101011111010 | 0.0821 | 0001010100000101 |

Figure 2:
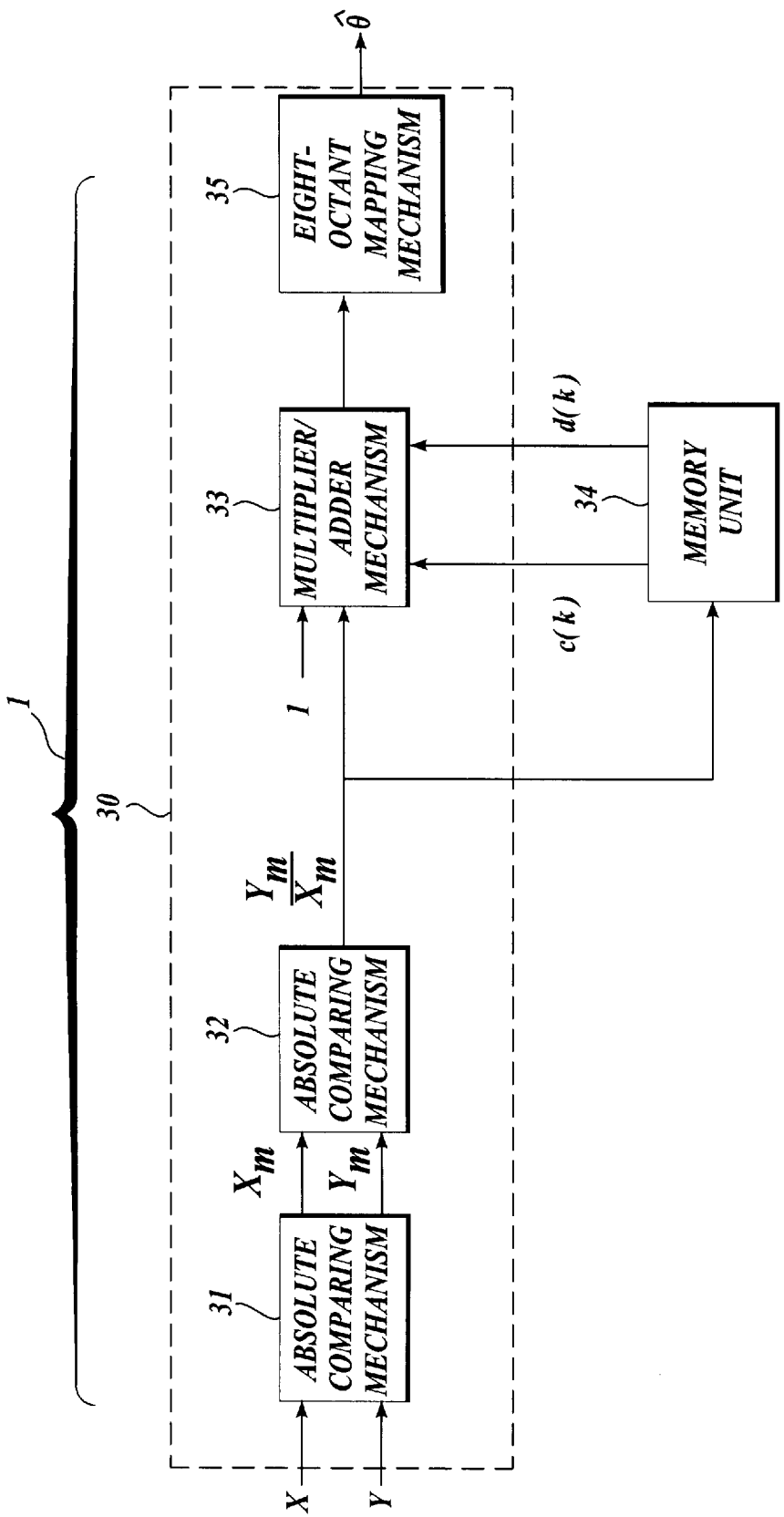
FIG. 2 shows a structure according to an embodiment of the present invention.

FIG. 2 shows a structure according to an embodiment of the present invention. The apparatus 1 of the present invention comprises a processing unit 30 and a memory unit 34. The apparatus transforms an input coordination point X and Y to a phase angle $\theta$ of an inverse arctangent function. The processing unit 30 employs equation (2) to operate, wherein $\hat{\theta}$ is the approximate value of $\theta$. The memory unit 30 is connected to the processing unit 30 to store c(k) and d(k) which use k as an index. The processing unit 30 can be further divided into: an absolute value comparing mechanism 31, a piecewise linear mechanism 32, a multiplier/adder mechanism 33, and an eight-octant mapping mechanism 35. The absolute value comparing mechanism 31 is used to generate the bigger one of absolute values of input values X and Y, called $x_m$, and generate the smaller one of absolute values of input values X and Y, called $y_m$. The $x_m$ and $y_m$ are sent to a piecewise linear mechanism 32 to obtain $$\frac{y_m}{x_m}.$$

The piecewise linear mechanism 32 can be implemented by a plurality of comparators or a divider. k is the continuous sb highest bits of $$\frac{y_m}{x_m}.$$

For example, if $$\frac{y_m}{x_m}$$

is represented by 12 bits ($b_{11}$~$b_0$), then sb=4 and the value of k is $b_{11}$~$b_8$. The value of k is also used to represent the address of the memory unit 34. The memory unit 34 stores c(k) and d(k), and table 1 is a kind of storing way. The multiplier/adder mechanism 33 is connected to the piecewise linear mechanism 32 and the memory unit 34 in order to generate $$c(k) + d(k) * \frac{y_m}{x_m}.$$

The eight-octant mapping mechanism 35 is connected to the multiplier/adder mechanism 33 in order to generate the result of equation (2).

Figure 3:
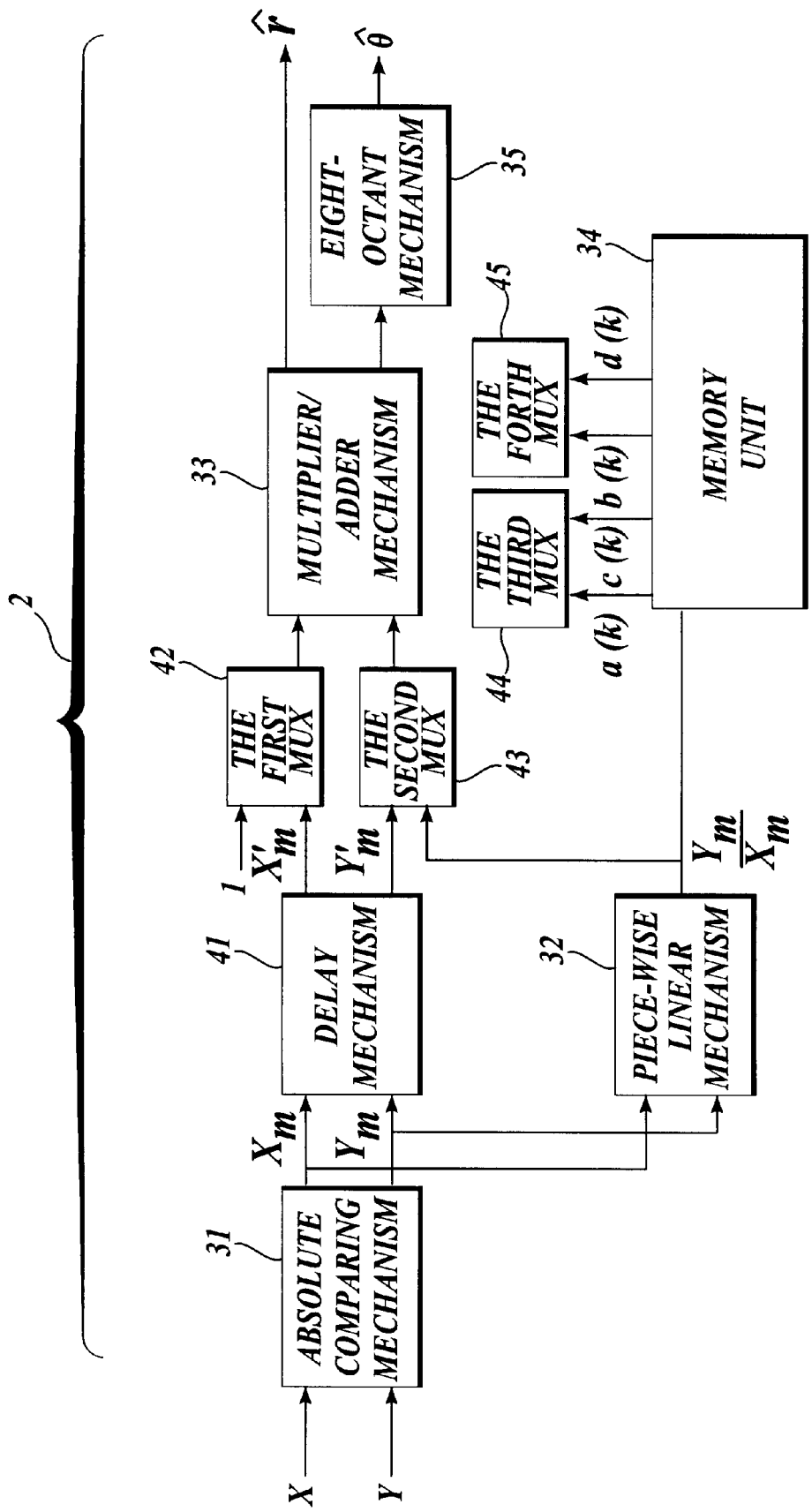
FIG. 3 shows a structure according to another embodiment of the present invention.

FIG. 3 shows an apparatus 2 according to another embodiment of the present invention. The apparatus 2 of the present invention combines the above phase angle $\theta$ generation method of an inverse arctangent function with U.S. Ser. No. 09/049,605, which discloses the generation of a radius r of a polar coordinate. The present invention will create the radius r at the transition time (such as leading edge or trailing edge of a pulse) of a system clock (not shown in figures), and θ will be created in the next transition time of the system clock. r̂ which is the approximate value of r is obtained through equation (8).

$$r̂ = a(k) \cdot x_m + b(k) \cdot y_m \tag{8}$$

A delay mechanism 41 is added in FIG. 3, and is connected to the absolute comparing mechanism 31. Depending on timing issue and data synchronization, $x_m$ and $y_m$ firstly go through the delay mechanism 41, go through the first multiplexer 42 and the second multiplexer 43 respectively. Then "1" and $$\frac{y_m}{x_m}$$

go through these two multiplexers. The memory unit 34 stores c(k), d(k), a(k), and b(k), and is connected to the multiplier/adder mechanism 33 through the third multiplexer 44 and the fourth multiplexer 45. At the transition time of the system clock, the first multiplexer 42 captures $x_m'$, the second multiplexer 43 captures $y_m'$. The parameters $x_m'$ and $y_m'$ are the output of the delay mechanism 41. The third multiplexer 44 and the fourth multiplexer 45 capture a(k) and b(k) which are the outputs of the memory unit 34. The parameter r̂ is calculated by the multiplier/adder mechanism 33 based on equation (8) and then be output. At the next transition time of the system clock, the first multiplexer 42 captures logic one, the second multiplexer 43 captures the $$\frac{y_m}{x_m},$$

which is the output of the piecewise linear mechanism 32. The third multiplexer 44 and the fourth multiplexer 45 capture c(k) and d(k) which are the output of the memory unit 34. After that, the multiplier/adder mechanism 33 computes $$c(k) + d(k) * \frac{y_m}{x_m},$$

and the eight-octant mapping mechanism 35 computes the approximate phase angle θ̂ depending on equation (2) and then output.

Figure 4:
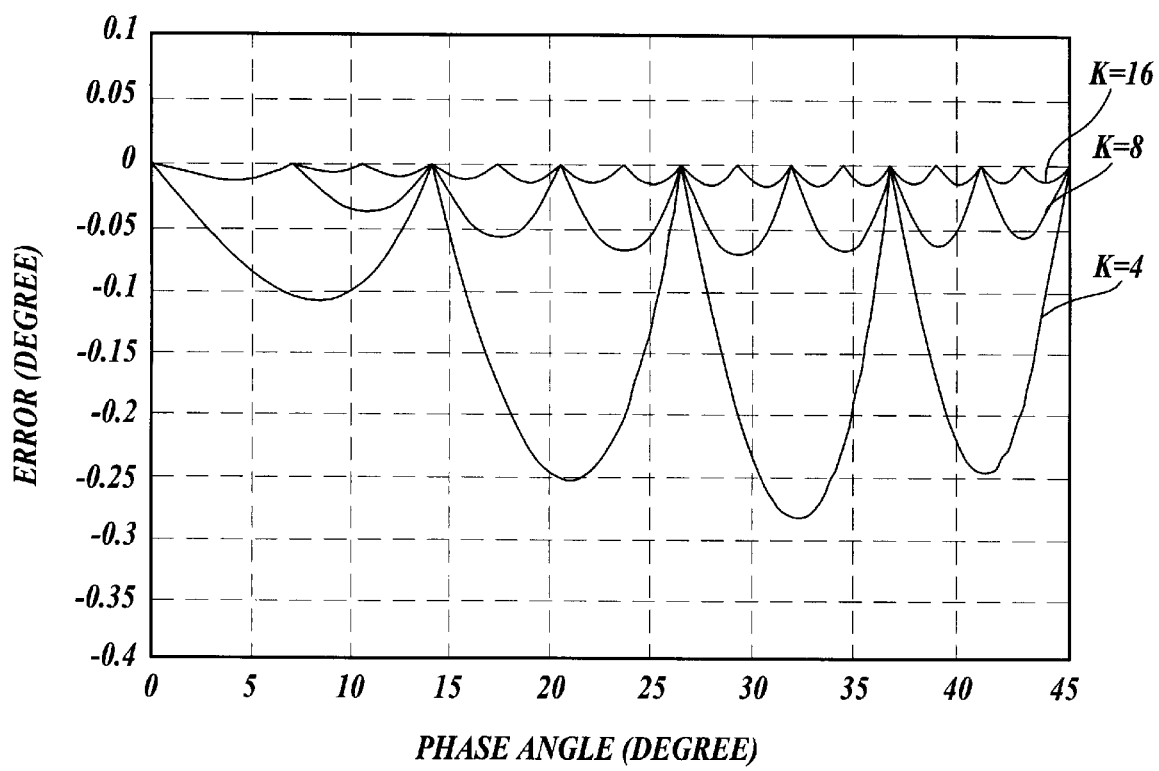
FIG. 4 shows a diagram of phase angles vs. errors according to the present invention.

FIG. 4 shows a diagram of phase angles vs. errors according to the present invention. When k=16, 16 piecewise lines are used to approach an inverse arctangent curve and a maximum error occurs at 30.7 degree. The maximum value of error is about 0.02 degree.

Figure 5:
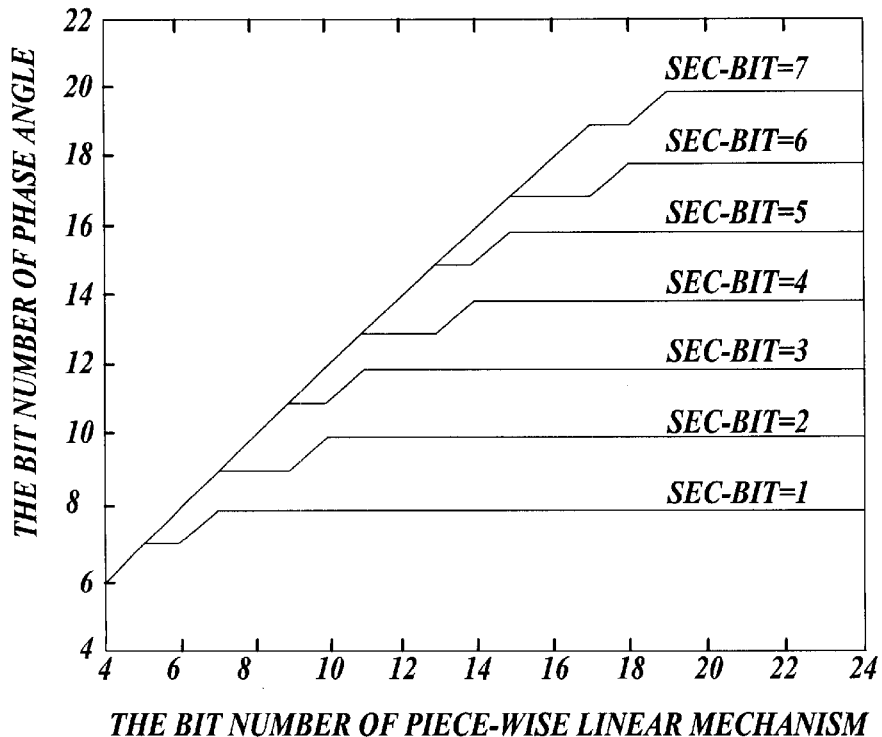
FIG. 5 shows a diagram of bit number of a piecewise linear mechanism vs. bit number of a phase angle according to the present invention.

FIG. 5 shows a diagram of bit number of a piecewise linear mechanism vs. bit number of phase angle according to the present invention. When the number T of piecewise lines is 16 and a 12-bit piecewise linear mechanism is used, the approximate phase angle θ̂ of the present invention can reach 13-bit resolution. When the bit number of the piecewise linear mechanism is big enough, the resolution of the present invention will be increased by 2 bits by adding 1 to the parameter "sb". When sb is fixed, if the bit number of the piecewise linear mechanism is increased by one, the resolution of the present invention is increased by one bit until saturation. FIG. 5 is convenient for user to choose the suitable hardware configuration.

The above-described embodiments of the present invention are intended to be illustrated only. Numerous alternative embodiments may be devised by those skilled in the art without departing from the scope of the following claims.

What is claimed is:

1. An apparatus for implementing an inverse arctangent function using piecewise linear theorem to simplify, used to transform a right-angled coordinate point X and Y to a phase angle θ of an inverse arctangent function, comprising:

a processing unit, used to transform a right-angled coordinate point X and Y to a phase angle θ of an inverse arctangent function; said processing unit employing the following equation to operate:

$$θ̂ = Ω(s) + Φ(s) \cdot \left( c(k) + d(k) \cdot \frac{y_m}{x_m} \right)$$

wherein θ̂ represents the approximate value of the phase angle θ, $y_m$ represents the smaller absolute value of the values X and Y, $x_m$ represents the smaller absolute value of the values X and Y; c(k) and d(k) represent coefficient parameters of the equation, Ω(s), Φ(s) are transformation parameters that are used to map the phase angle θ between 45 degree to 360 degree to the approximate phase angle θ̂ between 0 degree to 45 degree;

said processing unit including:

an absolute value comparing mechanism, used to generate $x_m$ and $y_m$;

a piecewise linear mechanism connected to said absolute value comparing mechanism for generating $$\frac{y_m}{x_m};$$

a multiplier/adder mechanism connected to said absolute value comparing mechanism and a memory unit for generating $$c(k) + d(k) * \frac{y_m}{x_m};$$

an eight-octant mapping mechanism connected to said multiplier/adder mechanism for generating $$θ = Ω(s) + Φ(s)\left(c(k) + d(k) \cdot \frac{y_m}{x_m}\right);$$

and a memory unit connected to said processing unit for storing the values of c(k) and d(k).

2. The apparatus of claim 1, wherein said piecewise linear mechanism is implemented by a plurality of comparators.

3. The apparatus of claim 1, wherein said piecewise linear mechanism is implemented by a divider.

4. The apparatus of claim 1, wherein said processing unit is used for transforming the right-angled coordinate point X and Y to a radius r of a polar coordinate; said processing unit operates according to the following equation:

$$r̂ = a(k) \cdot x_m + b(k) \cdot y_m$$

wherein r̂ is an approximate value of the r, said processing unit generates r̂ at a transition time of a clock applied in said apparatus, and generates the approximate phase angle θ̂ in the next transition time of said clock; and said memory unit further stores the values of a(k) and b(k).

5. The apparatus of claim 4, wherein said processing unit further comprises a first to fourth multiplexers, connected to said multiplier/adder mechanism; at a transition time of said clock, the first multiplexer captures $x_m$, the second multiplexer captures $y_m$, the third multiplexer captures a(k) and the fourth multiplexer captures b(k); at the next transition time of said clock, the first multiplexer captures 1, the second multiplexer captures $$\frac{y_m}{x_m},$$

the third multiplexer captures c(k) and the fourth multiplexer captures d(k).

6. A method for implementing an inverse arctangent function using piecewise linear theorem to simplify, used to transfer a right-angled coordinate point X and Y to a phase angle θ of an inverse arctangent function, comprising the following steps:

(a) using T-line combination to approach an inverse arctangent function between 0 degree to 45 degree, and in advance establishing and storing a table containing a plurality of coefficient parameters c(k) and d(k);

(b) determining which piecewise linear region said right-angled coordinate point is located at, and capturing corresponding values of the parameters c(k) and d(k) stored in said table; and (c) generating θ̂ which is an approximate value of the phase angle θ based on the following equation $$\hat{\theta} = \Omega(s) + \Phi(s) \cdot \left( c(k) + d(k) \cdot \frac{y_m}{x_m} \right),$$

wherein $\Omega(s)$, $\Phi(s)$ are transformation parameters that are used to map θ̂ between 45 degree to 360 degree to θ̂ between 0 degree to 45 degree.

7. The method of claim 6, wherein step (a) further comprises the step of storing the table of coefficient parameters a(k) and b(k), said parameters a(k) and b(k) are used for generating a radius r of a polar coordinate, said radius r is generated by the following equation, and r̂ is an approximate value of the r:

$$\hat{r} = a(k) \cdot x_m + b(k) \cdot y_m.$$

8. The method of claim 7, wherein step (c) further comprises the step of generating the radius r at a transition time of a clock and generating the phase angle θ at the next transition time of said clock.

* * * * *